Dec. 2, 1930.  O. R. TERRY  1,783,681
FOUNTAIN PEN REFILL INDICATOR
Filed Jan. 17, 1930
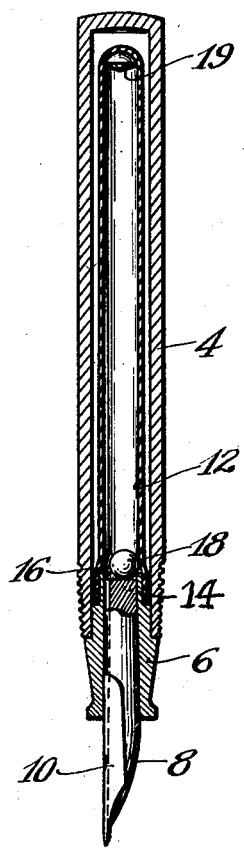
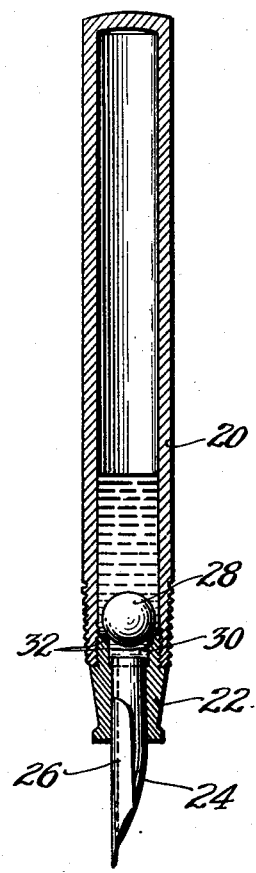
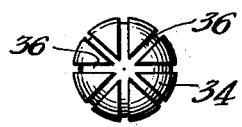
Inventor:
Owen R. Terry Patented Dec. 2, 1930

1,783,681

UNITED STATES PATENT OFFICE

OWEN R. TERRY, OF DETROIT, MICHIGAN

FOUNTAIN-PEN REFILL INDICATOR

Application filed January 17, 1930. Serial No. 421,455.

My invention relates generally to fountain pens and more particularly to means for indicating the quantity of ink contained in the barrel or sac of a fountain pen.

Various means have been proposed to provide an indication to the user of the quantity of ink contained in a fountain pen but to my knowledge none of these have met with public favor. The simple expedient of using a transparent barrel is not suitable for use in the ordinary sac-type fountain pen and even in other types it is impractical not only because the public prefers a pen having an ornamentally colored barrel but also because the ink adheres to the inside walls of the barrel and thus after a time makes it impossible to see the amount of ink in the barrel.

I have provided an indicator which, through an audible and/or tactile signal, serves as a fairly accurate indication of the quantity of ink in the pen.

It is, therefore, an object of my invention to provide improved means for indicating to the user the quantity of ink contained in a fountain pen.

A further object is to provide an audible signal indicative of the quantity of ink contained in the pen.

A further object is to provide an improved tactile signal device for indicating to the user of a fountain pen the quantity of ink contained therein.

A further object is to provide an improved audible and tactile signal device for indicating the quantity of ink contained in a fountain pen.

A further object is to provide an improved signal or indicator of the above mentioned type which is extremely simple and economical in construction, reliable in operation, and which will at all times serve as a convenient means to indicate to the user of the pen when his fountain pen needs refilling.

Other objects will appear from the following description, reference being had to the accompanying drawings, in which:

Fig. 1 is a central vertical section of a fountain pen of the sac type with my invention incorporated therein; and Fig. 2 is a similar view showing the application of my invention to a fountain pen of the sac-less type; and Fig. 3 is an enlarged elevation of a modified form of indicator ball.

In Fig. 1 the fountain pen illustrated comprises the usual barrel 4, section 6, feed bar 8, point 10 and sac 12. The section 6 has a tubular projection 14 over which the end of the sac 12 is secured in the usual manner. Shown resting within a cylindrical recess 16 in the section 6 is a ball 18. The ball 18 is preferably made of a material which has a specific gravity slightly greater than that of ink and which is not affected by the corrosive ingredients of the ink. I have found that such materials as glass, hard rubber, phenol condensation products, some of the lighter metals, etc., may be used. The ball 18 is preferably made as large as possible, the limitation being that it shall be of diameter sufficiently smaller than the least diameter of the sac 12, that it will move freely in the sac even when the latter is filled with ink, and that the ball will not at any time permanently or fixedly adhere to the sac or reservoir of the pen. A rubber or other suitable plug 19 may be permanently positioned in the closed end of the sac to prevent the ball from adhering to the end of the sac.

In Fig. 2 my invention is applied to a sac-less type of fountain pen which comprises a barrel 20, a section 22, feed bar 24, and pen 26. In this type of pen a ball 28, made of the same material as the ball 18, is confined within the barrel 20. The ball 28 may be made of larger diameter than that shown in Fig. 1, and is illustrated as of greater diameter than that of the cylindrical bore 30 in the section. To prevent the ball from sealing the end of this bore a plurality of notches 32 are cut in the end of the section, thereby permitting flow of ink from the barrel into the bore of the section even though the ball happens to be resting over the end of the bore. If desired, the ball may be grooved to accomplish the same purpose, as illustrated in Fig. 3, wherein the ball 34 has a plurality of great circle grooves 36 which make it impossible for the ball to interfere with the flow of ink from the barrel to the pen point.

Assuming that the sac of the fountain pen shown in Fig. 1 is filled or substantially filled with ink, inverting the pen from the position shown (that is, turning it point up) will cause the ball 18 gradually to gravitate to the closed end of the sac. It will move rather slowly because of the necessity of forcing the ink from below to above it. Since the ball will occupy a substantial portion of the cross-sectional area of the sac, the passageway for the flow of ink past the ball will be of comparatively restricted cross-sectional area and the downward progress of the ball materially impeded. Upon again inverting the pen (point downward) the ball will move downwardly at a relatively slow rate until it strikes the end of the feed bar 8, as shown in Fig. 1. Due to the fact that the velocity of its descent is materially impeded by the presence of ink in the sac, it will not strike the end of the feed bar with any appreciable force and the impact will, therefore, produce only a slight practically unnoticeable sound. If, however, the sac is empty, or substantially empty, when the pen is inverted to the position in which the point is downward, the ball will fall much more rapidly than in the previous instance and gather sufficient momentum to strike the end of the feed bar with a sharp impact, resulting in a clearly audible sound, and in a shock which will be readily perceptible to the tactile nerves of the fingers. This audible click and the sensible shock produced as the ball strikes the end of the feed bar immediately apprise the user of the pen that his pen is substantially empty and should be refilled. The velocity with which the ball will descend as the pen is inverted, and hence the intensity of the sound and shock generated by its impact with the end of the feed bar, will, to a certain degree, be dependent upon the quantity of ink in the sac of the pen. Thus the user will be able, after a little experience, to judge quite accurately the amount of ink in his pen.

The ball will naturally rest against the end of the feed bar when the sac type pen is being filled and thus will not interfere with the filling operation. The indicator is so simple that it may, at negligible cost, readily be incorporated in a standard pen without making any changes in the design thereof. The fact that the indicator produces a tactile signal as well as an audible signal is of particular advantage when the pen is used in a noisy place.

It will be understood that the indicator will operate every time the pen is moved from inverted vertical to its vertical writing position, so that, in the normal use of the pen, the indicator will be automatically operated, and therefore does not require any thought or conscious act upon the part of the user to cause it to function.

The device of my invention as embodied in a sac-less pen as illustrated in Fig. 2 operates in a manner similar to that above described except that an audible and tactile indication of the approximate quantity of ink in the barrel is obtained not only when the ball strikes the feed bar or pen section but also when it strikes the opposite end of the barrel.

If the grooved ball shown in Fig. 3 is used the indicating means of my invention may be incorporated in the ordinary sac-less pen without making any changes in the construction thereof and without danger of its interfering with the writing qualities of the pen. If desired the ball may have one or more passageways therethrough instead of having a grooved surface.

It has been found that the tactile signal or indication is of just as much or greater importance than the audible signal effect, in fact the ball as it rolls or slides in the barrel or sac, for some not clearly understood reason, produces slight vibrations which by their intensity and frequency indicate the quantity of ink in the pen. This is entirely distinct from the tactile and audible indication produced as the ball strikes the end of the feed bar. The impact of the ball as it strikes the closed end of the sac may also be felt and is audible to a limited extent.

It will be understood that while I believe it desirable to use a ball of as large a diameter as will travel within the pen under every condition of use, the advantageous results of my invention may also be obtained to a slightly lesser degree by using a comparatively small sized ball, and, while I have specified some of the materials which I consider preferable for use in making the indicator ball, other materials may be used with satisfactory results. Furthermore, the spherical shape of the indicator is not essential to the operativeness of my invention, but the indicator may be made in various other shapes.

While the form of the device herein shown and described is admirably adapted to fulfill the objects primarily stated, it is to be understood that it is not intended to confine the invention to the one form of embodiment herein disclosed for it is susceptible of embodiment in various forms, all coming within the scope of the claims which follow.

I claim:

1. In a fountain pen, the combination of a comparatively long substantially cylindrical reservoir with at least one rigid wall, and a rigid member of slightly lesser cross-sectional area than the cross-sectional area of said reservoir and confined for free movement within said reservoir, the specific gravity of said member being slightly greater than that of ink, said member having a shallow groove cut in the surface thereof, the clearance between the body of said member and the walls of said reservoir being sufficiently great to permit said member to fall at a comparatively unimpeded rate when air is in said reservoir, and being sufficiently small to cause said member to be materially impeded when falling through ink in said reservoir, and thus by the intensity of its impact against the rigid wall of said reservoir indicate the quantity of ink contained in the reservoir.

2. In a fountain pen, the combination of a comparatively long substantially cylindrical reservoir with at least one rigid wall, and a rigid member of slightly lesser cross-sectional area than the cross-sectional area of said reservoir and confined for free movement within said reservoir, the difference in the cross-sectional area of said member and said reservoir being great enough to permit passage of air at a sufficient rate so that said member will move substantially unimpeded when said reservoir is filled with air, and said difference in areas being sufficiently small that the presence of ink in the reservoir will greatly impede movement of said member in said reservoir, whereby the intensity of the impact of said member against said rigid wall will serve as an indication of the quantity of ink in said reservoir.

3. In a fountain pen, the combination of an ink reservoir, a rigid member substantially closing one end of said reservoir, and a rigid element, of specific gravity slightly greater than that of ink and of a size such that when said reservoir is filled with air said element will be capable of substantially unimpeded movement therein but will be materially retarded in its movement when ink is present in said reservoir, said element being adapted by impact against said rigid member to produce a tactile signal, the intensity of which is dependent upon the quantity of ink in said reservoir.

4. In a fountain pen, the combination of an ink reservoir, a rigid member substantially closing one end of said reservoir, and a rigid element, of specific gravity slightly greater than that of ink, and of a size sufficiently small to move freely in said reservoir when air is present therein and sufficiently large to have its movement in said reservoir greatly impeded by ink present in the reservoir, said element being adapted by impact against said rigid member to produce an audible signal, the intensity of which is dependent upon the quantity of ink in said reservoir.

In witness whereof, I hereunto subscribe my name this 15th day of January, 1930.

OWEN R. TERRY.